(12) United States Patent
Machii et al.

(10) Patent No.: US 12,203,309 B2
(45) Date of Patent: Jan. 21, 2025

(54) MOVING BODY CONTROL DEVICE

(71) Applicants: Noriyoshi Machii, Aichi (JP); Koji Ozawa, Aichi (JP); Yota Katayama, Aichi (JP)

(72) Inventors: Noriyoshi Machii, Aichi (JP); Koji Ozawa, Aichi (JP); Yota Katayama, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 305 days.

(21) Appl. No.: 17/692,167

(22) Filed: Mar. 11, 2022

(65) Prior Publication Data

US 2022/0290480 A1 Sep. 15, 2022

(30) Foreign Application Priority Data

Mar. 12, 2021 (JP) .................. 2021-040522

(51) Int. Cl.
| | |
|---|---|
| *E05F 15/41* | (2015.01) |
| *B60N 2/02* | (2006.01) |
| *B60N 2/20* | (2006.01) |
| *E05F 15/695* | (2015.01) |
| *E05F 15/697* | (2015.01) |
| *E05F 15/73* | (2015.01) |

(52) U.S. Cl.
CPC ............ *E05F 15/41* (2015.01); *B60N 2/0244* (2013.01); *E05F 15/695* (2015.01); *E05F 15/697* (2015.01); *E05F 15/73* (2015.01); *B60N 2/20* (2013.01); *E05Y 2201/434* (2013.01); *E05Y 2400/36* (2013.01); *E05Y 2400/40* (2013.01); *E05Y 2400/564* (2013.01); *E05Y 2900/55* (2013.01)

(58) Field of Classification Search
None
See application file for complete search history.

(56) References Cited

U.S. PATENT DOCUMENTS

| | | | |
|---|---|---|---|
| 5,983,567 A | 11/1999 | Mitsuda | |
| 2006/0137251 A1* | 6/2006 | Imai ..................... | H02H 7/0851 49/360 |

(Continued)

FOREIGN PATENT DOCUMENTS

| | | |
|---|---|---|
| JP | H7158338 A | 6/1995 |
| JP | H84416 A | 1/1996 |

(Continued)

*Primary Examiner* — Daniel L Greene
(74) *Attorney, Agent, or Firm* — HAUPTMAN HAM, LLP

(57) ABSTRACT

A moving body control device includes a pinching detecting unit. The pinching detecting unit is configured to calculate a first difference between physical quantities at a beginning and an end of a first period, calculate a plurality of second differences for respective second periods obtained by dividing the first period, each of the differences being a difference between physical quantities at a beginning and an end of the corresponding second period, and determine that pinching of an object has occurred in a case in which the first difference is equal to or greater than a first threshold value and a ratio of second differences equal to or greater than a second threshold value to the plurality of the second differences is equal to or greater than a third threshold value.

7 Claims, 9 Drawing Sheets

(56) References Cited

U.S. PATENT DOCUMENTS

| | | | |
|---|---|---|---|
| 2006/0220604 A1* | 10/2006 | Hirai | H02H 7/0851 |
| | | | 318/286 |
| 2007/0084120 A1* | 4/2007 | Kobayashi | G05B 19/4061 |
| | | | 49/27 |
| 2007/0106429 A1 | 5/2007 | Endo et al. | |
| 2008/0297076 A1* | 12/2008 | Sakai | E05F 15/41 |
| | | | 700/47 |
| 2008/0303460 A1* | 12/2008 | Oxle | H02H 7/0851 |
| | | | 318/264 |
| 2009/0295556 A1* | 12/2009 | Inoue | E05F 15/695 |
| | | | 49/506 |
| 2021/0146802 A1* | 5/2021 | Koh | B60N 2/0244 |
| 2022/0090431 A1* | 3/2022 | Endo | B60J 1/00 |
| 2022/0158573 A1* | 5/2022 | Romaszko | E05F 15/695 |
| 2022/0205300 A1* | 6/2022 | Masuzawa | B60J 1/17 |

FOREIGN PATENT DOCUMENTS

| | | |
|---|---|---|
| JP | H8149871 A | 6/1996 |
| JP | 2001248358 A | 9/2001 |
| JP | 2007131138 A | 5/2007 |
| JP | 2010119210 A | 5/2010 |

* cited by examiner

IN A CASE OF PITCHING

IN CASE OF DISTURBANCE

CASE WHERE THERE IS PITCHING

TENDENCY DIFFERENCE Δls (m)

TENDENCY DIFFERENCE: $\Delta Is(m) = I(n - (m-1) * Z) - I(n - (m-1) * Z - W)$ $$\Delta Is(1) = I(n) - I(n-W1)$$
$$\Delta Is(2) = I(n-Z) - I(n-Z-W2)$$
$$\Delta Is(3) = I(n-2Z) - I(n-2Z-W3)$$
$$\Delta Is(4) = I(n-3Z) - I(n-3Z-W4)$$
$$\Delta Is(5) = I(n-4Z) - I(n-4Z-W5)$$
$$\Delta Is(6) = I(n-5Z) - I(n-5Z-W6)$$

NORMAL CASE

MOVING BODY CONTROL DEVICE

CROSS-REFERENCE TO RELATED APPLICATIONS

This application is based upon and claims the benefit of priority from Japanese Patent Application No. 2021-040522 filed on Mar. 12, 2021, the entire contents of which are incorporated herein by reference.

FIELD

One or more embodiments of the present invention relate to a device for controlling a moving body such as an electric seat equipped in a vehicle, and particularly to a moving body control device having a function of detecting pinching of foreign matter.

BACKGROUND

A vehicle such as an automatic four-wheeled vehicle is equipped with electric seats that move back and forth by a rotation of a motor. In a case where a front-back position of such an electric seat is adjusted, in the related art, the seat position has been adjusted by manually operating an operation unit provided near the seat and moving the seat forward or backward. On the other hand, in recent years, a vehicle has appeared, which has a function of registering a seat position that suits a user's preference in advance, identifying the user at a time of boarding, and automatically moving the seat to a seat position corresponding to the user.

In the vehicle having the automatic adjustment function of the seat position as described above, if the front seat automatically moves backward in a state where a person or an object exists between the front seat and the back seat, the person or the object may be pinched between the front and back seats, thereby threatening safety. The same thing can happen in a manual electric seat. Therefore, the seat control device is required to have a function of promptly detecting pinching, stopping or reversing a motor, and eliminating the pinching state in a case where the pinching has occurred.

When pinching occurs, a motor current increases as a load applied to the motor increases. Therefore, by calculating a change (difference) in the motor current in a predetermined period and comparing this difference value with a threshold value, it is possible to determine whether the pinching has occurred. However, since a flexible cushioning material is generally used for the seat, it takes time from the occurrence of the pinching to the detection of the pinching. This will be described with reference to FIG. 9.

FIG. 9 illustrates a state where a person's leg F is pinched between a front seat S1 and a back seat S2. Such pinching occurs, for example, in a case where a backward movement of the seat S1 and a forward movement of the seat S2 are performed at the same time, and the like. When the front seat S1 moves backward by a distance d1 from an initial position indicated by a one-dotted dash line to a position indicated by a solid line, the leg F is pinched between the seats S1 and S2. In addition to the person's leg, a person's body, luggage, animals, or the like may be pinched.

However, since the seat S1 is flexible, the load of the motor is insufficient at the position of the solid line in FIG. 9, and the pinching is not detected. After that, a dent is formed in the seat S1 at a pinched portion indicated by K, and the seat S1 further moves backward by a distance d2 and stops at a position indicated by a broken line. At this position, the load of the motor increases, a difference value of the motor current becomes equal to or greater than the threshold value, and the pinching is detected.

Although a case where the seat has flexibility has been described here, the same thing as described above may occur when a soft object is pinched even if the seat has rigidity.

JP-A-2007-131138 discloses describes a seat control device capable of appropriately detecting pinching in a case where an object is pinched by a soft portion of the seat. Further, JP-A-2010-119210, JP-A-HOS-149871, JP-A-H08-004416, JP-A-2001-248358, and JP-A-H07-158338 disclose a power window device capable of accurately detecting pinching of a soft object in a vehicle window.

SUMMARY

In FIG. 9, as described above, the pinching cannot be detected at the solid line position where the seat S1 has moved by the distance d1 and the pinching can be detected at the broken line position where the seat S1 has moved by the distance d1+d2. Therefore, in order to accurately detect the pinching, it is necessary to set a long period for calculating the difference value of the motor current. However, if this calculation period becomes long, it becomes easier to detect the pinching, but on the other hand, a possibility of erroneously detecting the pinching due to the disturbance increases.

One or more embodiments of the present invention are provided to a moving body control device capable of reliably detecting pinching and suppressing erroneous detection due A moving body control device of one or more embodiments of the present invention controls a moving body that moves by a rotation of a motor, the moving body control device including: a pinching detecting unit that detects pinching of an object due to a movement of the moving body based on a change in a physical quantity indicating a rotation state of the motor; and a control unit that controls an operation of the motor based on a detection result of the pinching detecting unit. The pinching detecting unit is configured to calculate a difference between a physical quantity at a beginning of a first period and a physical quantity at an end of the first period as a first difference, and calculate differences for a plurality of second periods as a plurality of second differences, respectively, the plurality of second periods being obtained by dividing the first period, each of the differences being a difference between a physical quantity at a beginning of a second period and a physical quantity at an end of the corresponding second period. The pinching detecting unit determines that pinching of the object has occurred in a case in which the first difference is equal to or greater than a first threshold value and a ratio of second differences equal to or greater than a second threshold value to the plurality of second differences is equal to or greater than a third threshold value.

In this way, the pinching of the object is detected in a case where a first condition that the first difference in the first period is equal to or greater than the first threshold value and a second condition that the ratio of second differences equal to or greater than the second threshold value in the second periods is equal to or greater than the third threshold value are satisfied. The ratio of second differences equal to or greater than the second threshold value in the second periods indicates the tendency of the change in the motor current in the first period, and this ratio differs between a case where disturbance has been applied and a case where the pinching has occurred. Therefore, in the case of the disturbance, even if the first condition is satisfied, the second condition is not satisfied. Therefore, even in a case where the motor current fluctuates greatly due to the disturbance, it is possible to avoid erroneous determination that pinching has occurred. As a result, even if the period for calculating the difference value of the motor current is set to be long in order to ensure the detection of the pinching by the flexible seat, the disturbance and the pinching are clearly distinguished, and it is possible to suppress that erroneous detection of the pinching occurs.

In one or more embodiments of the present invention, for example, as the physical quantity indicating a rotation state of the motor, a motor current flowing through the motor may be used. Alternatively, instead of the motor current, a rotation speed of the motor may be used as the physical quantity.

In one or more embodiments of the present invention, the pinching detecting unit may calculate a tendency score SC which indicates a tendency of a change in the physical quantity in the first period by SC=N/M, where the first difference is $\Delta I$, the second difference is $\Delta Is(m)$, the first threshold value is $\alpha$, the second threshold value is $\beta$, the third threshold value is $\gamma$, and the number of $\Delta Is(m)$ that is equal to or greater than $\beta$ among M $\Delta Is(m)$ in the first period is N, and pinching detecting unit may determine that the pinching of the object has occurred in a case in which conditions $\Delta I \geq \alpha$ and $SC \geq \gamma$ are satisfied.

In one or more embodiments of the present invention, the pinching detecting unit may determine that the pinching of the object has occurred in a case in which a relationship between M and N is M=N and conditions $\Delta I \geq \alpha$, and SC=1 are satisfied.

The moving body of one or more embodiments of the present invention may be a seat of a vehicle or a window of a vehicle.

Further, the pinching detecting unit of one or more embodiments of the inventions may calculate a difference between a physical quantity at a beginning of a predetermined period and a physical quantity at an end of the predetermined period, and determine that pinching of the object has occurred in a case in which the difference is equal to or greater than a predetermined threshold value and a change in the physical quantity in the predetermined period is monotonically increased or monotonically decreased.

According to one or more embodiments of the present invention, it is possible to provide a moving body control device capable of reliably detecting pinching and suppressing erroneous detection due to disturbance even if a moving body or an object has flexibility.

Figure 3A:
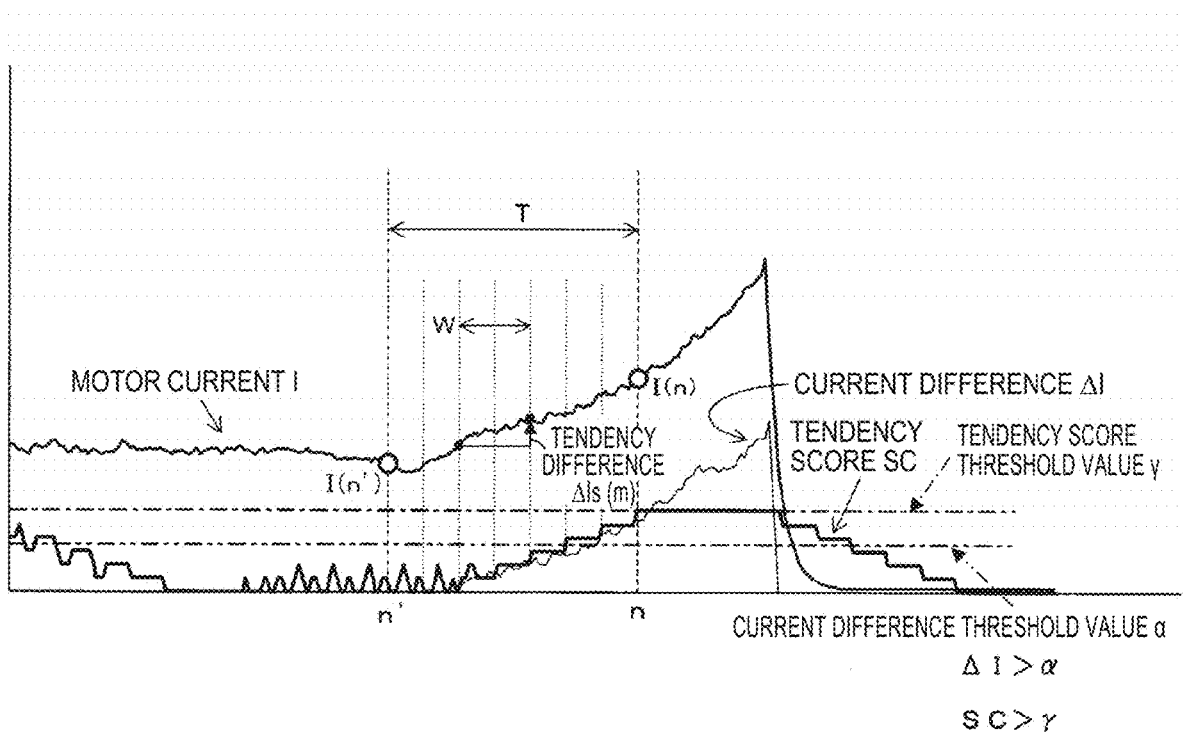
Figure 3B:
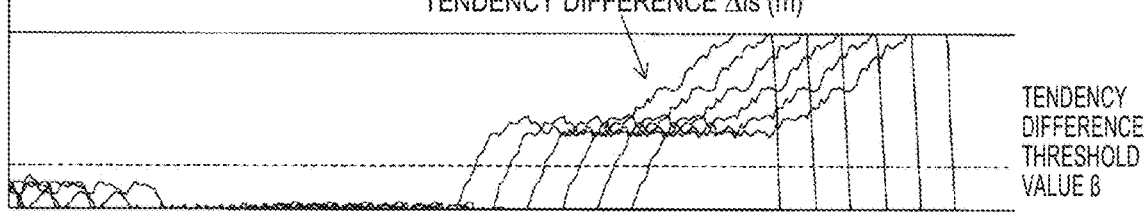
Figure 4:
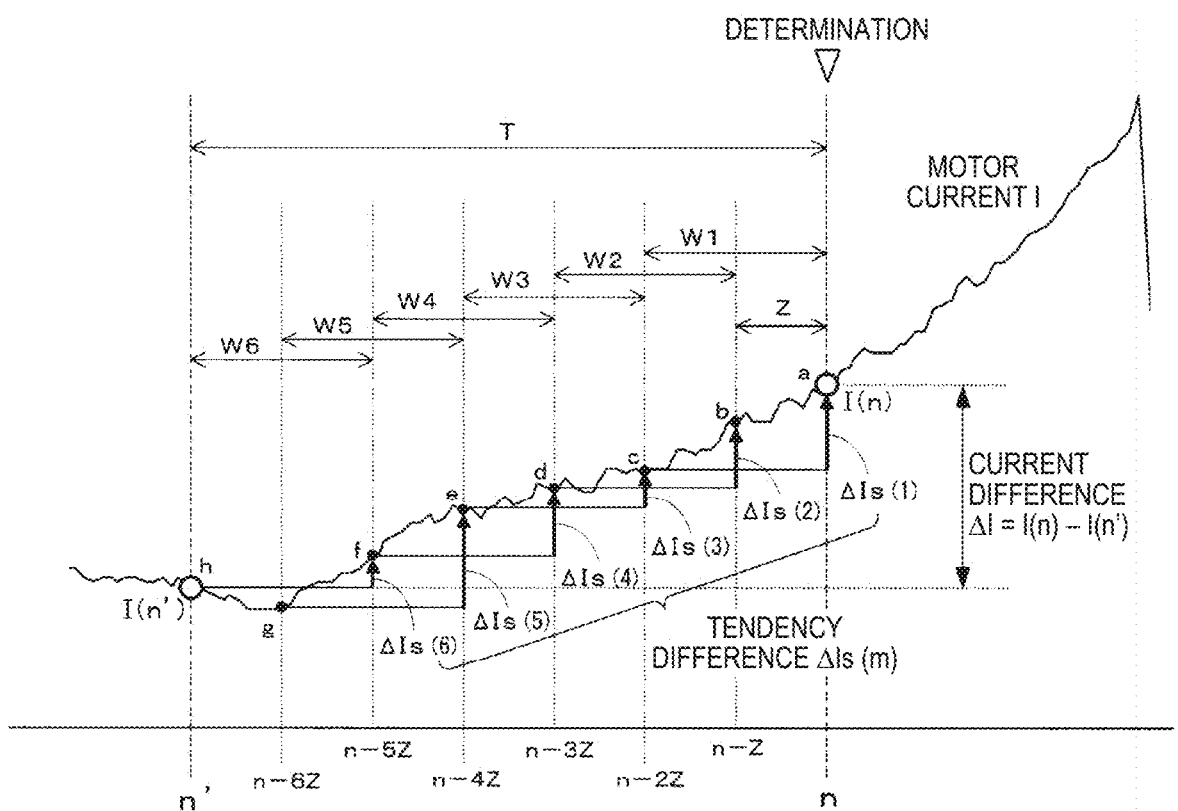
Figure 5:
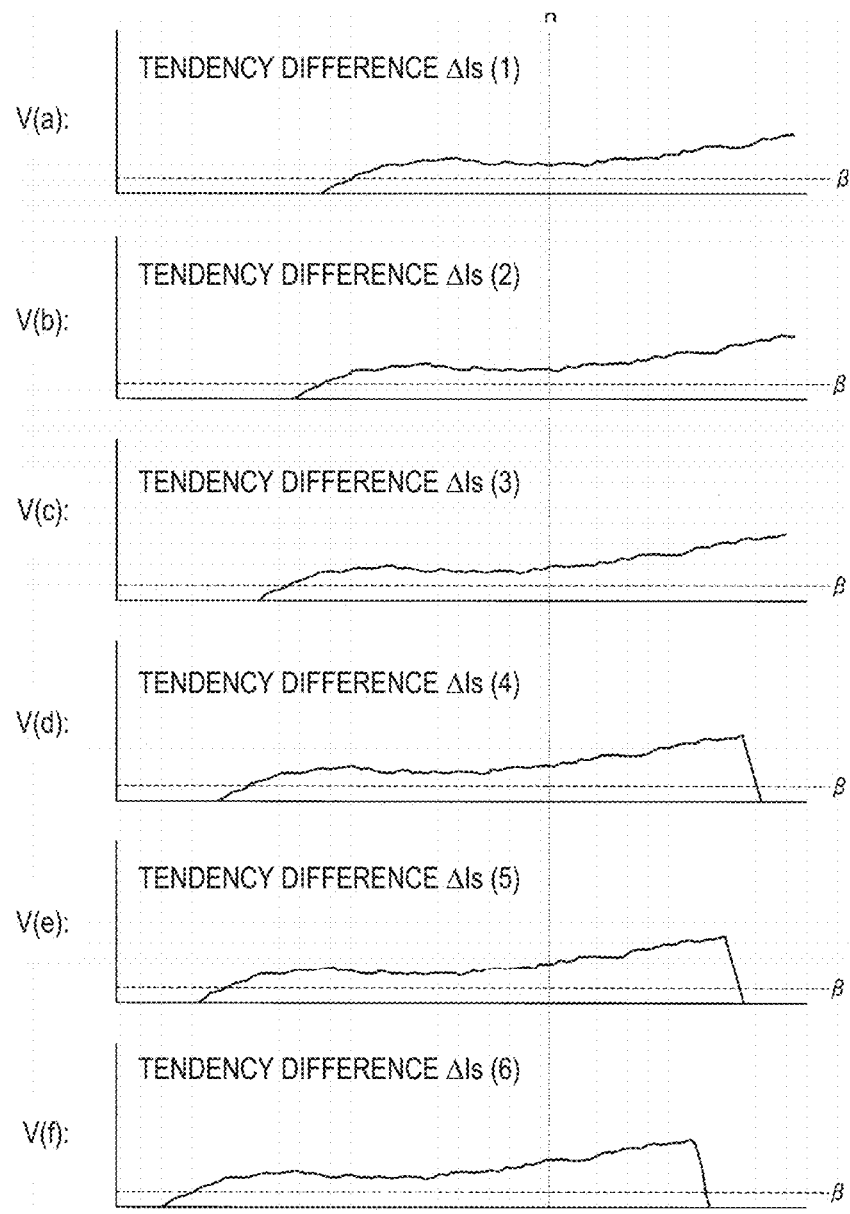
Figure 6:
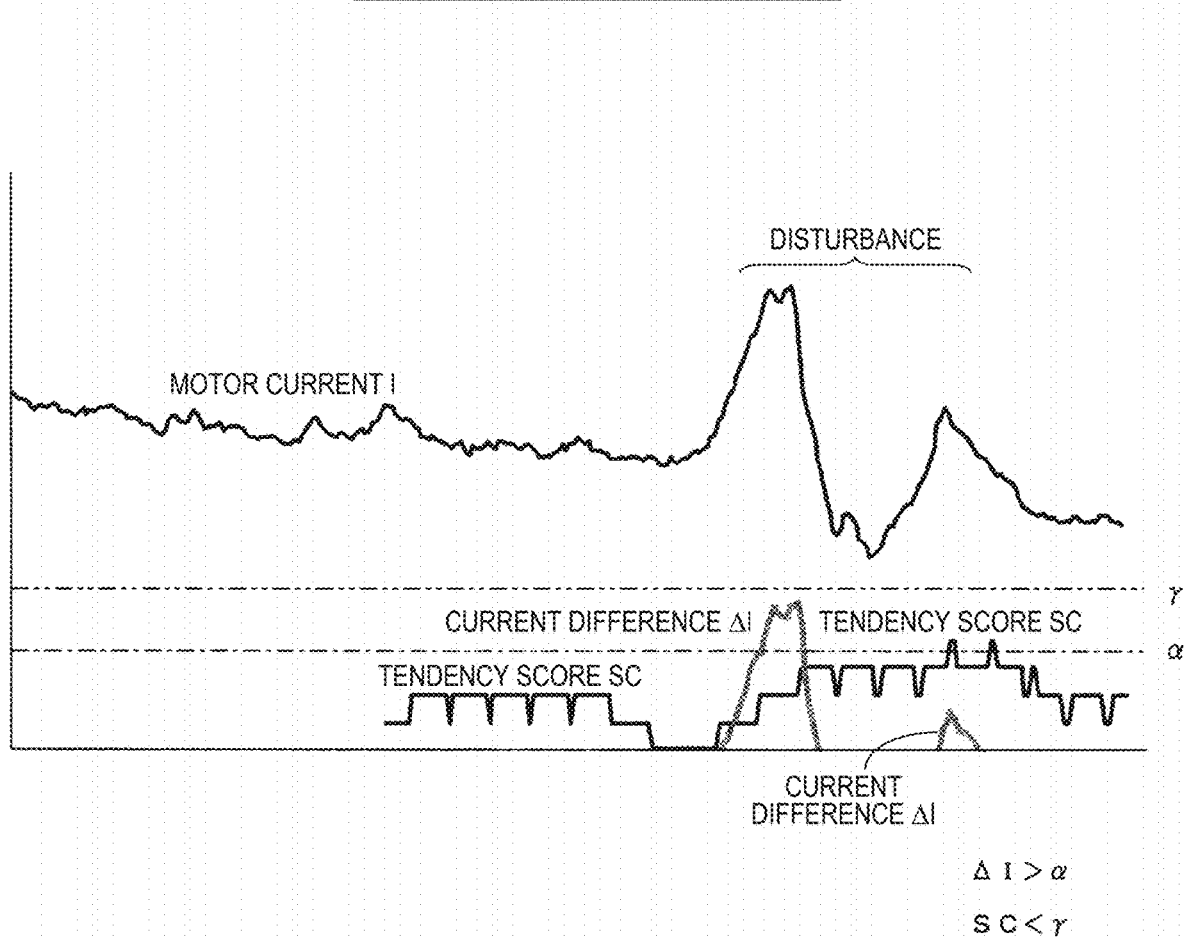
Figure 7:
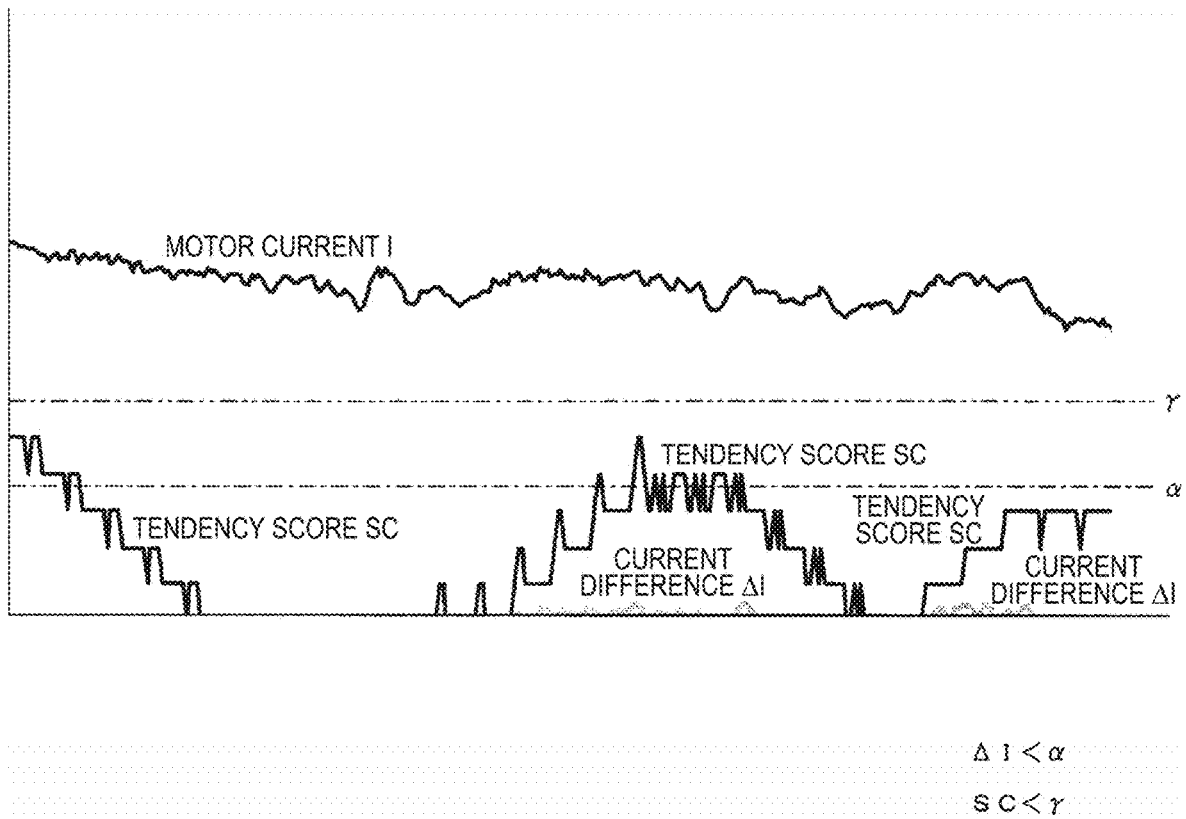
Figure 8:
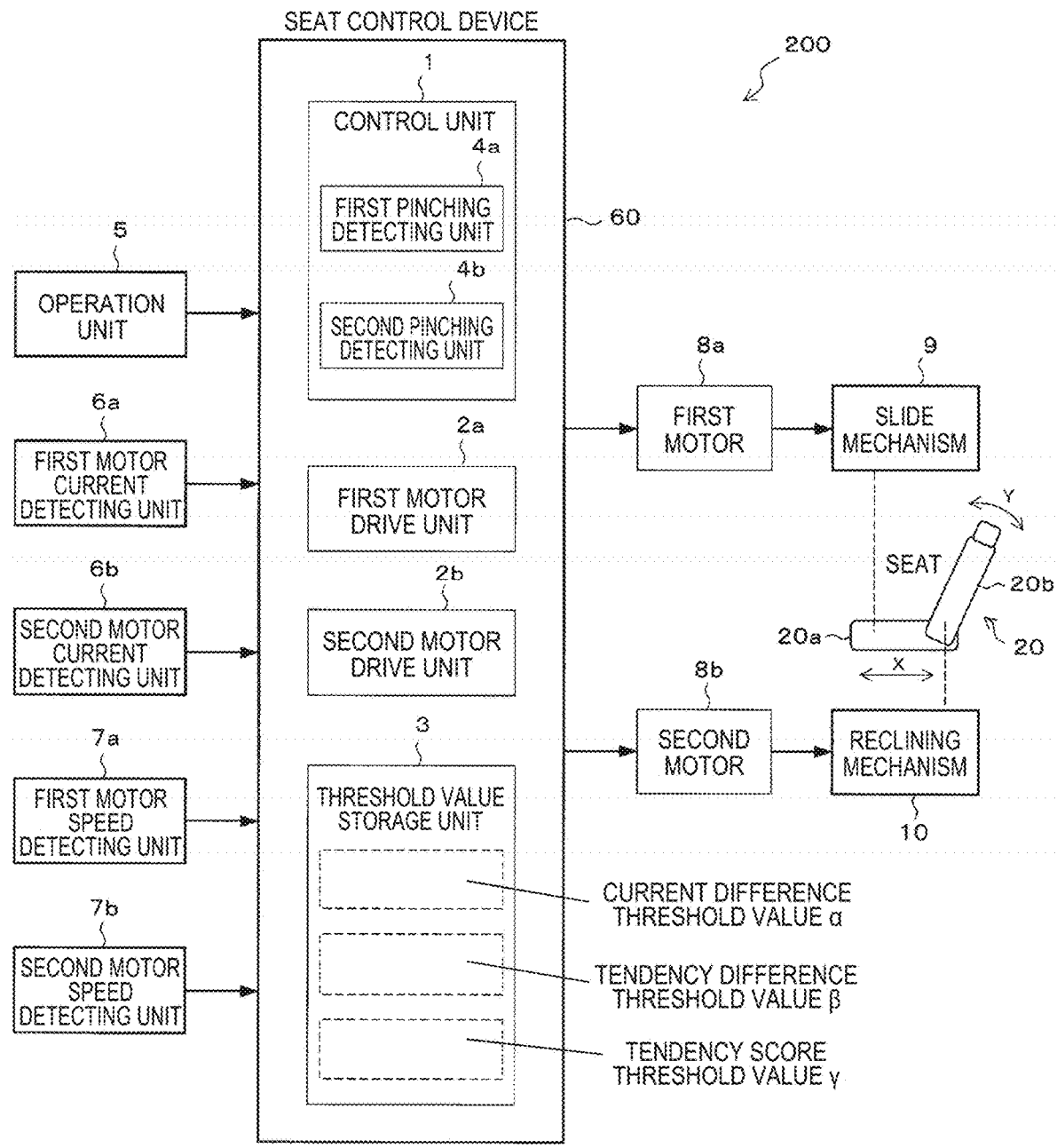
Figure 9:
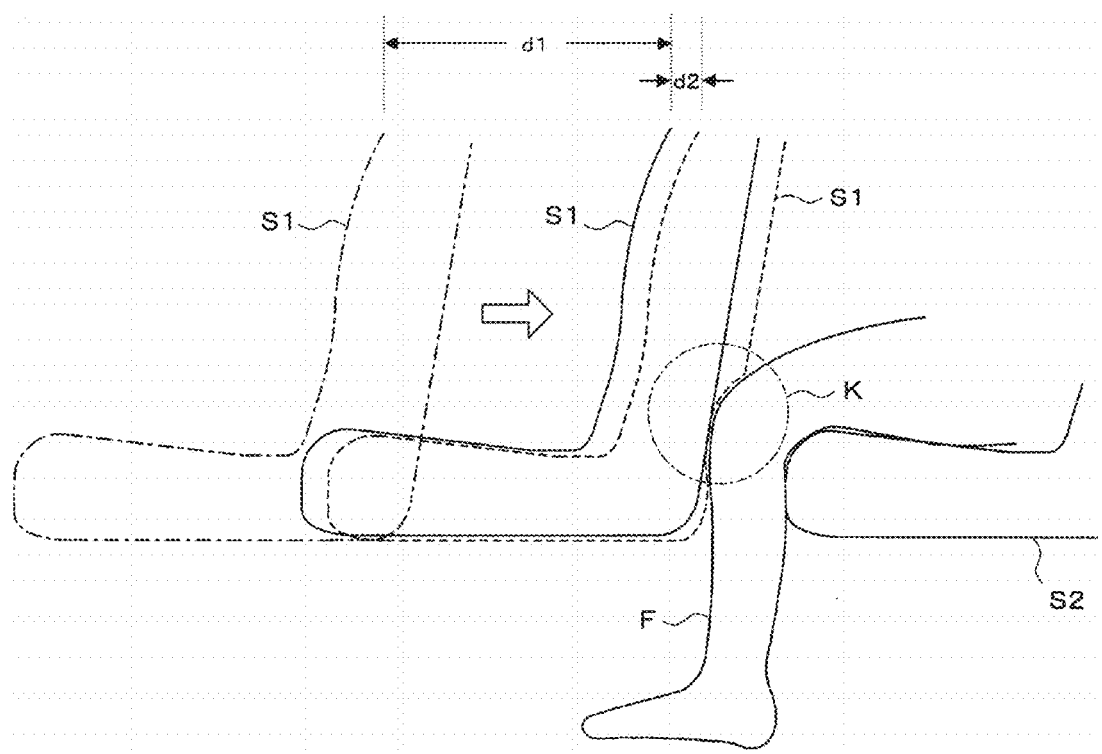

FIGS., 2A and 2B are schematic diagrams for explaining a basic principle of the embodiment of the present invention;

FIGS. 3A and 3B are graphs for explaining a current difference, a tendency difference, a tendency score, and their threshold values;

FIG. 4 is a graph for explaining a method of calculating the current difference and the tendency difference;

FIG. 5 is a graph illustrating changes in each tendency difference;

FIG. 6 is a graph illustrating changes in motor current, current difference, and tendency score in a case where there is disturbance;

FIG. 7 is a graph illustrating changes in motor current, current difference, and tendency score in a normal case;

FIG. 8 is a block diagram of an electric seat system including a seat control device according to a second embodiment of the present invention; and FIG. 9 is a diagram illustrating a state of being pinched by a flexible seat.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the present invention will be described with reference to the drawings. In the drawings, the same parts or corresponding parts are designated by the same reference numerals. In the following, an example in which a vehicle seat as a moving body will be taken as an example, and a case where the present invention is applied to a seat control device will be described.

Figure 1:
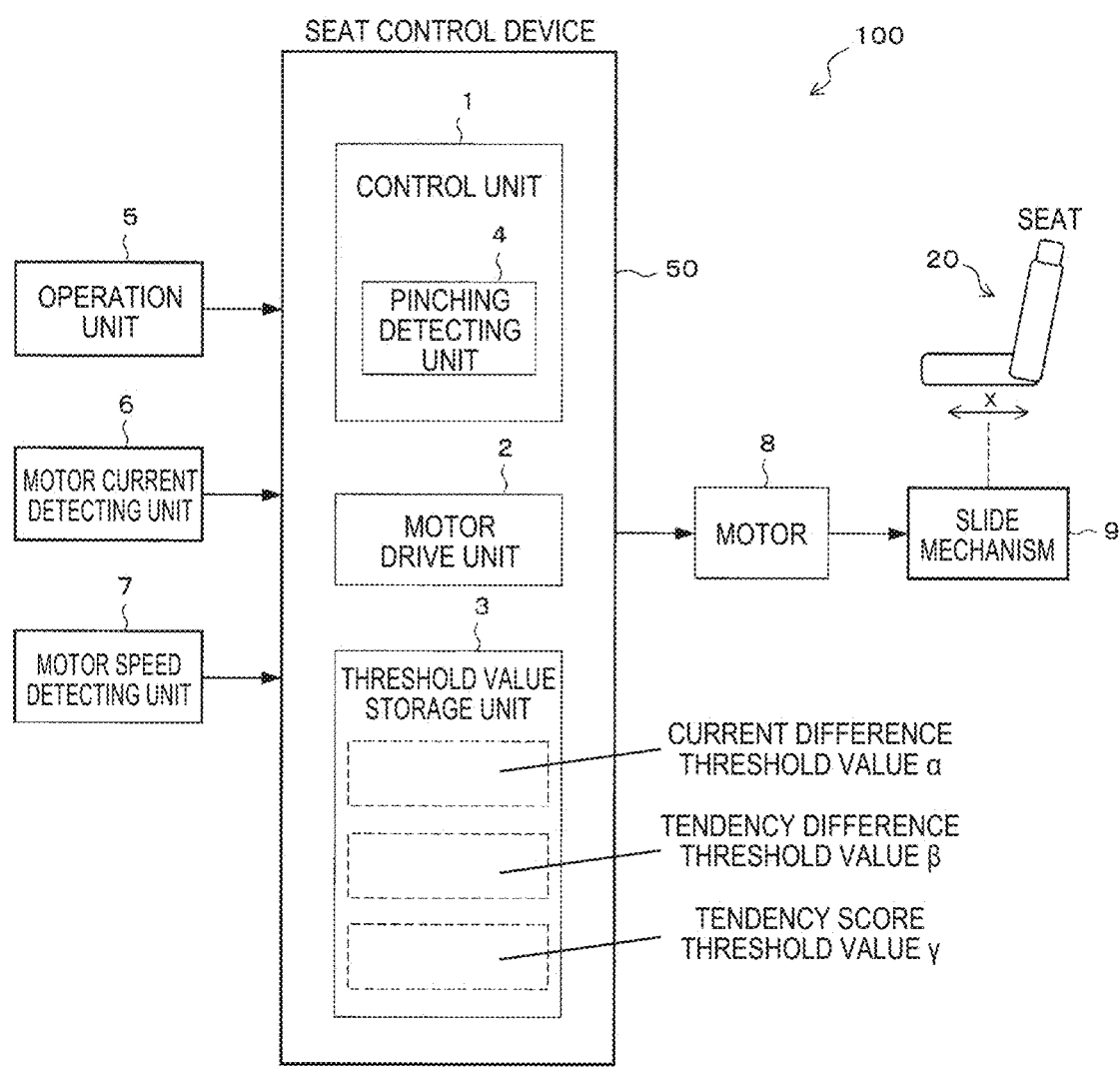
FIG. 1 is a block diagram of an electric seat system including a seat control device according to a first embodiment of the present invention.

FIG. 1 illustrates an example of a seat control device 1 and an electric seat system 100 using the same according to a first embodiment of the present invention. The electric seat system 100 is equipped in a vehicle such as an automatic four-wheeled vehicle and includes the seat control device 50, an operation unit 5, a motor current detecting unit 6, a motor speed detecting unit 7, a motor 8, a slide mechanism 9, and a seat 20. The seat 20 is an electric seat driven by the motor 8 and the slide mechanism 9.

The operation unit 5 is configured of a switch for manually operating an operation of the seat 20, and the like. The motor current detecting unit 6 detects a motor current flowing through the motor 8. The motor speed detecting unit 7 detects a rotation speed of the motor 8. The motor 8 is a motor for moving the seat 20 in an X direction (front-and-rear direction) The slide mechanism 9 is coupled to the motor 8 and the seat 20, converts the rotational motion of the motor 8 into a linear motion, and moves the seat 20 in the X direction by a predetermined distance.

The seat control device 1 includes a control unit 1, a motor drive unit 2, and a threshold value storage unit 3, The control unit 1 is configured of a CPU and the like, and controls an overall operation of the seat control device 50.

The control unit 1 is provided with a pinching detecting unit 4. A function of the pinching detecting unit 4 is actually realized by software. A method of detecting the pinching will be described in detail later. The motor drive unit 2 is configured of a circuit that generates a drive signal (for example, a PWM signal) for rotating the motor 8, and the like. The threshold value storage unit 3 stores threshold values $\alpha$, $\beta$, and $\gamma$ for the pinching detecting unit 4 to determine the presence or absence of pinching between seats. These threshold values will be described in detail later.

Figure 2A:
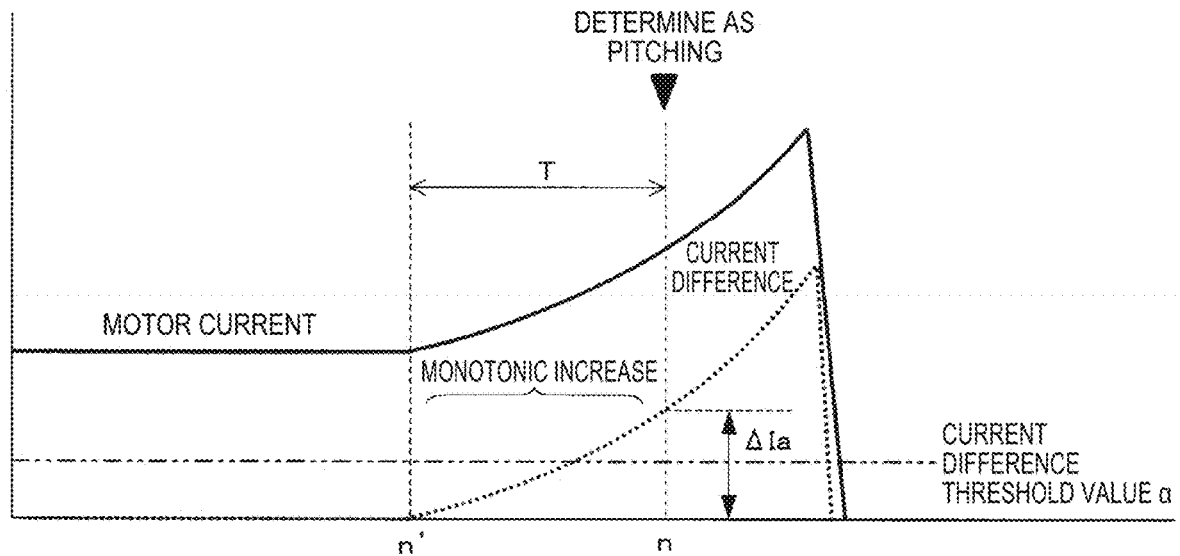
Figure 2B:
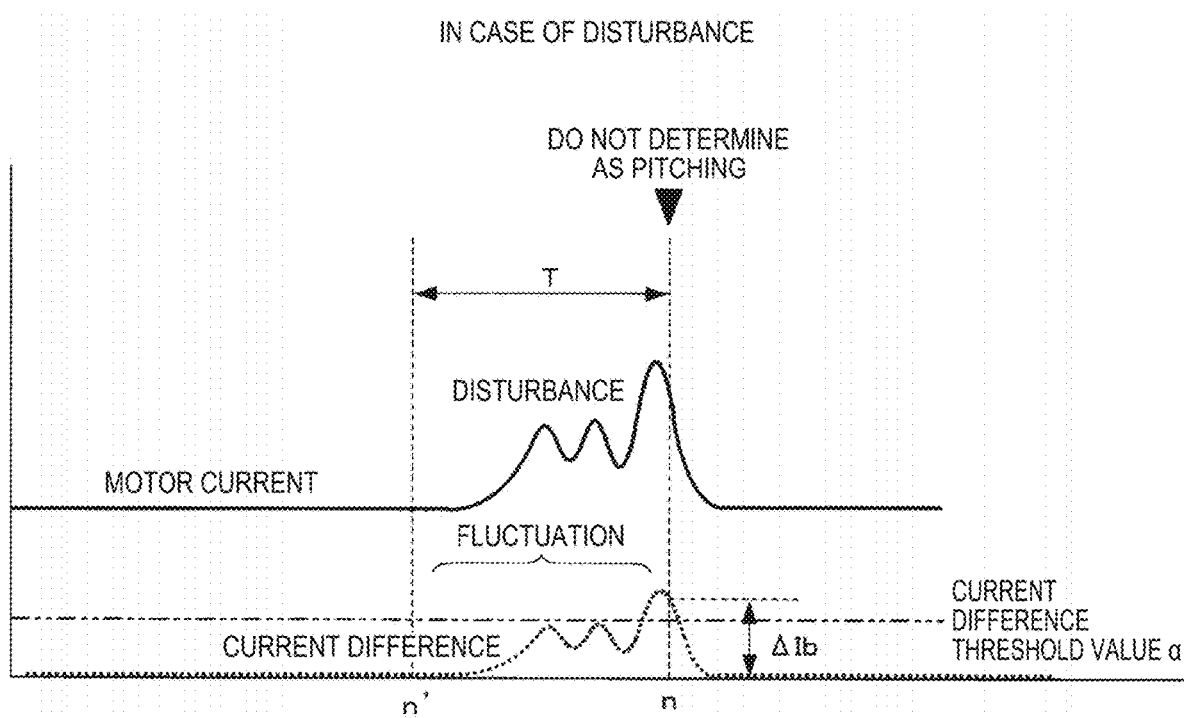

Next, a basic principle of the pinching detection according to the embodiment of the present invention will be described with reference to FIGS. 2A and 2B. FIG. 2A illustrates an example of changes in a motor current and a current difference in a case where pinching has occurred, and FIG. 2B illustrates an example of changes in the motor current and the current difference in a case where a disturbance has occurred. A horizontal axis of each drawing is a count value of a pulse output from a rotation sensor (not illustrated) attached to the motor 8, and corresponds to a moving distance of the seat 20 (the same applied to FIGS. 3A and 3B to FIG. 7 described later). Although the motor current and the current difference actually fluctuate finely as illustrated in FIGS. 3A and 3B, they are illustrated in a simplified manner in FIGS. 2A and 2B.

In FIG. 2A, a period T is a unit section for pinching determination, and the presence or absence of the pinching is determined based on a state of a change in the motor current within the period T. This period T gradually shifts to a right direction in the drawing in time, and each time, the presence or absence of the pinching in the period is determined. The period corresponds to a "first period" in the present invention.

Now, assuming that the pinching has occurred at a beginning time point n' in the period T, the load of the motor 8 starts to increase from this time point, and the motor current also increases accordingly. Further, as a rate of an increase in the motor current increases with time, the current difference indicating the change in the motor current at regular intervals also increases. Therefore, a current difference ΔIa at an end time point n in the period T is equal to or greater than the current difference threshold value α, which is a first condition for the pinching determination. However, under this first condition alone, in a case where disturbance has occurred in the period T as illustrated in FIG. 2B, if a current difference ΔIb at the time point n is equal to or greater than the current difference threshold value α, even though the disturbance occurs, it is erroneously determined that the pinching has occurred.

Therefore, in the present invention, in the case of the pinching, the current difference monotonically increases in the period I as illustrated in FIG. 2A, whereas in the case of the disturbance, the current difference monotonically increases in the period I as illustrated in FIG. 2B, thereby being used as a second condition of the pinching determination focusing on the fact that the current difference does not monotonically increase (fluctuate) in the period T. Then, in a case where both the first condition and the second condition are satisfied, it is determined that the pinching has occurred.

Therefore, in the case of the disturbance illustrated in FIG. 2B, since the first condition is satisfied but the second condition is not satisfied, it is not determined to be pinched, and an erroneous determination can be avoided. Further, in the present invention, it is determined whether the change in the current difference in the period T is monotonically increased by using a unique method described below, thereby improving the detection accuracy of the pinching.

Next, a specific method fir the pinching detection according to the present invention will be described with reference to FIGS. 3A and 3B to FIG. 5.

FIGS. 3A and 3B are graphs for explaining parameters used for determining the pinching. In FIG. 3A, the motor current I, the current difference ΔI, the current difference threshold value α, and the period T are the same as those described in FIGS. 2A and 2B. The current difference threshold value α corresponds to the "first threshold value" in the present invention. In the present invention, in addition to these, new parameters such as a tendency difference ΔIs(m), a tendency difference threshold value β, a tendency score SC, and a tendency score threshold value γ are used.

The tendency difference ΔIs(m) is calculated as the difference in each motor current I at the beginning time point and the end time point of the period W for each of a plurality of periods (only one period W is illustrated in FIG. 3A) obtained by dividing the period T. This detail will be described with reference to FIG. 4.

In FIG. 4, the period T is divided into seven, and a plurality of (here, six) periods W1 to W6 is set within the period. These periods W1 to W6 correspond to the "second period" in the present invention, A width of each of the periods W1 to W6 is the same, which is twice the division width Z (W1 to W6=2Z). Further, each of the periods W1 to W6 is set to be offset by Z. The tendency difference ΔIs(m) is a general term for the six tendency differences ΔIs(1) to ΔIs(6) calculated for each period, and is calculated by the following equation.

$$\Delta Is(m) = I(n-[m-1]xZ-W) - I(n-[m-1]xZ-W) \tag{1}$$

The tendency difference ΔIs(1) is a tendency difference in the period W1, and is calculated as a difference between the motor current (current at point c) at the beginning time point (n−2Z) of the period W1 and the motor current (current at point a=I(n)) at the end time point (n) of the period W1. That is, when m=1 and W=W1 in the above equation (1), the tendency difference ΔIs(1) is expressed by the following equation.

$$\Delta Is(1) = I(n) - I(n-W1)$$

The tendency difference ΔIs(2) is a tendency difference in the period W2, and is calculated as a difference between the motor current (current at point d) at the beginning time point (n−3Z) of the period W2 and the motor current (current at point b) at the end time point (n−Z) of the period W2. That is, when m=2 and W=W2 in the above equation (1), the tendency difference ΔIs(2) is expressed by the following equation.

$$\Delta Is(2) = I(n-Z) - I(n-Z-W2)$$

The tendency difference ΔIs(3) is a tendency difference in the period W3, and is calculated as a difference between the motor current (current at point e) at the beginning time point (n−4Z) of the period W3 and the motor current (current at point c) at the end time point (n−2Z) of the period W3. That is, when in m=3 and W=W3 in the above equation (1), the tendency difference ΔIs(3) is expressed by the following equation.

$$\Delta Is(3) = I(n-2Z) - I(n-2Z-W3)$$

The tendency difference ΔIs(4) is a tendency difference in the period W4, and is calculated as a difference between the motor current (current at point f) at the beginning time point (n−5Z) of the period W4 and the motor current (current at point d) at the end time point (n−3Z) of the period W4. That is, when m=4 and W=W4 in the above equation (1), the tendency difference ΔIs(4) is expressed by the following equation.

$$\Delta Is(4) = I(n-3Z) - I(n-3Z-W4)$$

The tendency difference ΔIs(5) is a tendency difference in the period W5, and is calculated as a difference between the motor current (current at point g) at the beginning time point (n−6Z) of the period W5 and the motor current (current at point e) at the end time point (n−4Z) of the period W5. That is, when m=5 and W=W5 in the above equation (1), the tendency difference ΔIs(5) is expressed by the following equation.

$$\Delta Is(5) = I(n-4Z) - I(n-4Z-W5)$$

The tendency difference ΔIs(6) is a tendency difference in the period W6, and is calculated as a difference between the motor current (current=I(n') at point h) at the beginning time point (n') of the period W6 and the motor current (current at point f) at the end time point (n−5Z) of the period W6. That is, when m=6 and W=W6 in the above equation (1), the tendency difference ΔIs(6) is expressed by the following equation.

$$\Delta Is(6)=I(n-5Z)-I(n-5Z-W6)$$

As described above, when the six tendency differences ΔIs(1) to ΔIs(6) are calculated in the period T, the period I is shifted to the right direction by a predetermined amount in FIG. 4, and in the new period T after the shift, six tendency differences ΔIs(1) to ΔIs(6) are calculated in the same manner as described above. FIG. 3B illustrates a state of a change in the tendency difference ΔIs(m) sequentially calculated in this way. The tendency difference threshold value β is a threshold value set for this tendency difference ΔIs(m) and corresponds to the "second threshold value" in the present invention. The tendency difference of FIG. 3B is illustrated as independent tendency differences ΔIs(1) to ΔIs(6) at the items V(a) to V(f) in FIG. 5, respectively. In FIG. 5, scales on the vertical axis and the horizontal axis are different from those in FIG. 3B.

By comparing each of the tendency differences ΔIs(1) to ΔIs(6) with the tendency difference threshold value β, it is possible to grasp the tendency of the change in the motor current I in the period T. For example, as illustrated in FIG. 5, in a case where the tendency differences ΔIs(1) to ΔIs(6) are all equal to or greater than the threshold value β at the time point n, it indicates that the motor current I monotonically increases in the period T (ignoring small fluctuations in current). On the other hand, if, for example, among the tendency differences ΔIs(1) to ΔIs(6), the number of differences which are equal to or greater than the threshold value β is three and the number of differences which are less than the threshold value β is three, it indicates that the motor current I is fluctuated in the period T.

Therefore, in the present invention, as the parameter indicating the tendency of the change in the motor current I in the period T, the tendency score SC calculated for each period T based on the tendency difference ΔIs(m) is used. Among the M tendency differences ΔIs(m) in the period T, when the number of ΔIs(m) which are equal to or greater than the threshold value β is N, the tendency score SC is calculated by the following equation.

$$SC=N/M \qquad (2)$$

The tendency score threshold value γ in FIG. 3A is a threshold value set for this tendency score SC and corresponds to the "third threshold value" in the present invention.

In a case where the above-described tendency differences ΔIs(1) to ΔIs(6) are all equal to or greater than the threshold value β, M=6 and N=6 in the above equation (2), so that the tendency score SC is SC=1. On the other hand, in a case where there are three tendency differences which are equal to or greater than the threshold value β, M=6 and N=3 in the above equation (2), so that the tendency score SC is SC=0.5. Further, in a case where there is no tendency difference which is equal to or greater than the threshold value β, M=6 and N=0 in the equation (2), so that the tendency score SC is SC=0.

As described above, the tendency score SC is in the range of 1≥SC≥0, and the closer the SC is to 1, the stronger the monotonous increase tendency of the current difference ΔI of the motor current is illustrated. Therefore, the tendency score SC is compared with the tendency score threshold value γ, and if SC≥γ, the current difference monotonically increases in the period T as illustrated in FIG. 2A and it can be considered that the second condition of the above-described pinching determination is satisfied. In the example of FIG. 3A, since the current difference ΔI is equal to or greater than the threshold value α (ΔI≥α) and the tendency score SC is equal to or greater than the tendency score threshold value γ (SC≥γ) at time point n, it is determined that both the first condition and the second condition are satisfied, and the pinching has occurred.

In a case where the pinching is detected, the control unit 1 eliminates the pinching state by stopping or reversing the motor 8 by the motor drive unit 2.

FIG. 6 illustrates an example of changes in the motor current I, the current difference ΔI, and the tendency score SC when there is a disturbance. The disturbance occurs due to an increase in the load applied to the motor through the seat, for example, in a case where an occupant sitting in the seat shakes his or her body. In FIG. 6, the current difference ΔI exceeds the threshold value α due to the disturbance, but the tendency score SC does not exceed the threshold value γ because the change in the current difference ΔI is not monotonically increased. Therefore, although the above-described first condition is satisfied, the second condition is not satisfied, so that it is not erroneously determined that the pinching has occurred even if the load of the motor increases.

FIG. 7 illustrates an example of changes in the motor current I, the current difference ΔI, and the tendency score SC in a normal case without pinching or disturbance. In this case, since the fluctuation of the motor current I is small, the current difference ΔI does not exceed the threshold value α. Further, since the motor current I does not monotonically increase over a long period of time, the tendency score SC also does not exceed the threshold value γ. Therefore, since neither the first condition nor the second condition is satisfied, the pinching is not detected.

According to the first embodiment described above, in a case where the current difference ΔI is equal to or greater than the current difference threshold value α (first condition) and the tendency score SC is equal to or greater than the tendency score threshold value (second condition), it is determined that the pinching has occurred. The tendency score SC indicates the tendency of the change in the motor current I in the period T, and the value of the tendency score SC differs between a case where the disturbance has been applied and a case where the pinching has occurred. Therefore, in the case of the disturbance, even if the first condition is satisfied, the second condition is not satisfied, and thereby even in a case where the motor current I fluctuates greatly due to the disturbance, it is possible to avoid to erroneously determine that the pinching has occurred. As a result, even if the period T for calculating the difference ΔI of the motor current I is set long in order to ensure the detection of the pinching by the flexible seat 20, the disturbance and the pinching are clearly distinguished and it is possible to suppress that the pinching is erroneously detected.

FIG. 8 illustrates an example of a seat control device 60 and an electric seat system 200 using the same according to a second embodiment of the present invention. In FIG. 8, two pinching detecting units 4a and 4b, two motor current detecting units 6a and 6b, two motor speed detecting units 7a and 7b, two motors 8a and 8b, and a reclining mechanism 10 are provided. Since other configurations are the same as those in FIG. 1, the description of the part overlapping with FIG. 1 will be omitted.

In FIG. 8, the seat portion 20a of the electric seat 20 is moved in the X direction by the first motor 8a and the slide mechanism 9, and the backrest 20b of the seat 20 is tilted in the Y direction by the second motor 8b and the reclining mechanism 10.

The first motor drive unit 2a and the second motor drive unit 2b drive the first motor 8a and the second motor 8b, respectively. The first motor current detecting unit 6a and the second motor current detecting unit 6b detect motor currents flowing through the first motor 8a and the second motor 8b, respectively. The first motor speed detecting unit 7a and the second motor speed detecting unit 7b detect rotation speeds of the first motor 8a and the second motor 8b, respectively. The first pinching detecting unit 4a detects the pinching of the object in a case where the seat 20 moves in the X direction based on the current detected by the first motor current detecting unit 6a. The second pinching detecting unit 4b detects the pinching of the object in a case where the backrest 20b is tilted in the Y direction based on the current detected by the second motor current detecting unit 6b.

Also in such a second embodiment, based on the same principle as in the first embodiment, the first pinching detecting unit 4a detects the pinching of the object due to the movement of the seat 20, and the second pinching detecting unit 4b detects the pinching of the object due to the tilt of the backrest 20b. Further, in a case where any of the pinching detecting units 4a and 4b detects the pinching, the first motor 8a or the second motor 8b is stopped or reversed by the motor drive units 2a and 2b, and thereby the control unit 1 eliminates the pinching state.

In the case of the second embodiment, the threshold values $\alpha$, $\beta$, and $\gamma$ stored in the threshold value storage unit 3 may be set separately corresponding to the first pinching detecting unit 4a and the second pinching detecting unit 4b, respectively.

In the present invention, it is possible to employ various embodiments in addition to the above-described embodiments.

For example, in the above-described embodiments, an example in which the pinching is detected based on the motor current detected by the motor current detecting units 6, 6a, and 6b is given, but the pinching may be detected based on a frequency of a ripple included in the motor current.

Further, the physical quantity for pinching detection is not limited to the current and frequency, but may be the rotation speeds of the motors detected by the motor speed detecting units 7, 7a, and 7b. In this case, when the pinching occurs, the rotation speed of the motor decreases, and the difference in rotation speed indicates the tendency of the monotonic decrease in the period I of FIG. 2A.

Further, in determining whether the current or the rotation speed is monotonically increased or decreased in the period T, other mathematical methods may be used instead of the above equations (1) and (2).

Further, in the above-described embodiments, in FIGS. 1 and 8, an example in which the motor drive units 2, 2a, and 2b are provided in the seat control devices 50 and 60 is given, but these motor drive units 2, 2a, and 2b may be provided outside the seat control devices 50 and 60.

Further, in FIGS. 1 and 8, the motors 8, 8a, and 8b are provided outside the seat control devices 50 and 60, but these motors 8, 8a, and 8b may be provided in the seat control devices 50 and 60.

Further, in the above-described embodiments, an example in which the seat control device is equipped in the vehicle is given, but the present invention may also be applied to a power window device that opens and closes a window of the vehicle by a motor, and further, to a moving body control device used in a field other than the vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A moving body control device that controls a moving body that moves by a rotation of a motor, the moving body control device comprising:
   a pinching detecting unit that detects pinching of an object due to a movement of the moving body based on a change in a physical quantity indicating a rotation state of the motor; and
   a control unit that controls an operation of the motor based on a detection result of the pinching detecting unit,
   wherein the pinching detecting unit is configured:
   to calculate a difference between a physical quantity at a beginning of a first period and a physical quantity at an end of the first period as a first difference;
   to calculate differences for a plurality of second periods as a plurality of second differences, respectively, the plurality of second periods being obtained by dividing the first period, each of the differences being a difference between a physical quantity at a beginning of a second period and a physical quantity at an end of the corresponding second period; and
   to determine that pinching of the object has occurred in a case in which the first difference is equal to or greater than a first threshold value and a ratio of second differences equal to or greater than a second threshold value to the plurality of the second differences is equal to or greater than a third threshold value.

2. The moving body control device according to claim 1, wherein the physical quantity is a motor current flowing through the motor.

3. The moving body control device according to claim 1, wherein the physical quantity is a rotation speed of the motor.

4. The moving body control device according to claim 1, wherein the pinching detecting unit is configured:
   to calculate a tendency score SC which indicates a tendency of a change in the physical quantity in the first period by $$SC=N/M,$$

where the first difference is $\Delta I$, the second difference is $\Delta Is(m)$, the first threshold value is $\alpha$, the second threshold value is $\beta$, the third threshold value is $\gamma$, and the number of $\Delta Is(m)$ that is equal to or greater than $\beta$ among M $\Delta Is(m)$ in the first period is N; and
   to determine that the pinching of the object has occurred in a case in which conditions $\Delta I \geq \alpha$ and $SC \geq \gamma$ are satisfied.

5. The moving body control device according to claim 4, wherein the pinching detecting unit determines that the pinching of the object has occurred in a case in which a relationship between M and N is M=N and conditions $\Delta I \geq \alpha$ and $SC=1$ are satisfied.

6. The moving body control device according to claim 1, wherein the moving body is a seat of a vehicle.

7. The moving body control device according to claim 1, wherein the moving body is a window of a vehicle.

* * * * *